United States Patent [19]

Grimes

[11] Patent Number: 5,040,335
[45] Date of Patent: Aug. 20, 1991

[54] INNER PANEL ASSEMBLY WITH INTEGRAL ENERGY ABSORBER

[75] Inventor: John A. Grimes, Dover, N.H.
[73] Assignee: Davidson Textron Inc., Dover, N.H.
[21] Appl. No.: 670,767
[22] Filed: Mar. 18, 1991
[51] Int. Cl.5 .............................................. B60J 5/04
[52] U.S. Cl. .................................... 49/502; 296/146; 296/189
[58] Field of Search .................. 49/502, 501; 296/188, 296/189, 905, 906, 146, 153, 152; 280/751

[56] References Cited

U.S. PATENT DOCUMENTS

| | | | |
|---|---|---|---|
| 3,874,119 | 4/1975 | Renner et al. | 49/502 |
| 3,936,090 | 2/1976 | Aya et al. | 49/502 X |
| 3,989,275 | 11/1976 | Finch et al. | 280/751 |
| 4,769,951 | 9/1988 | Kaaden | 49/502 |
| 4,786,100 | 11/1988 | Kleemann et al. | 296/153 X |
| 4,890,877 | 1/1990 | Ashtiani-Zarandi et al. | 296/153 X |

Primary Examiner—Philip C. Kannan
Attorney, Agent, or Firm—John C. Evans

[57] ABSTRACT

An inner door panel assembly for a vehicle door is adapted to be connected to an outer door panel to form a space therebetween for a window and a window regulator; the inner door panel assembly is an all plastic composite assembly including an inner covering on the inner surface of a molded plastic substrate. The substrate includes first and second integrally formed hollow boxes thereon faced in the direction of the interior space to absorb side impact energy directed against the side of the outer door panel.

5 Claims, 1 Drawing Sheet

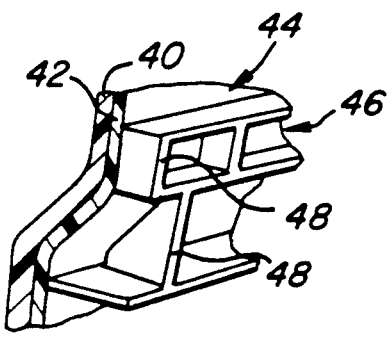
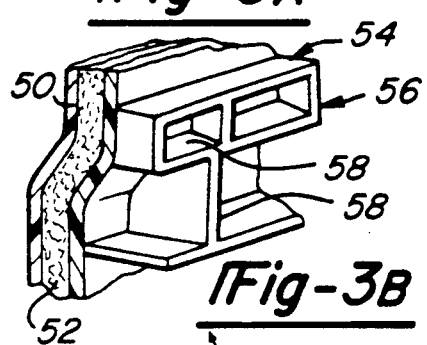
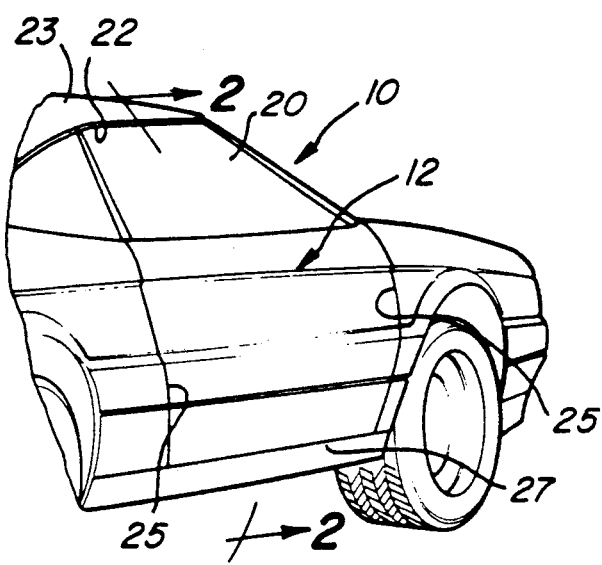
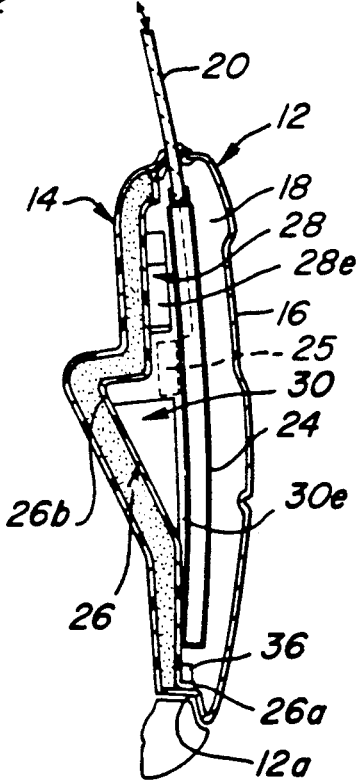
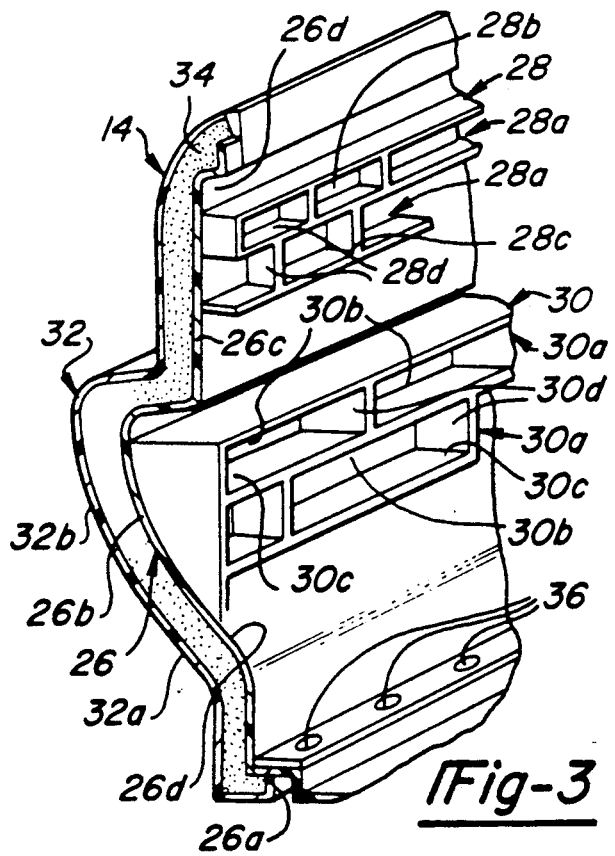

INNER PANEL ASSEMBLY WITH INTEGRAL ENERGY ABSORBER

FIELD OF THE INVENTION

This invention relates to vehicle doors and more particularly to side impact energy absorbers for vehicle doors.

BACKGROUND OF THE INVENTION

Various proposals have been suggested for absorbing energy from side impact forces on vehicle doors. One example is set forth in U.S. Pat. No. 3,936,090 which discloses a vehicle door with an inner shock absorbing pad having a metal channel insert that is configured to absorb energy by collapsing when a side impact force is imposed thereon.

Other energy absorbers for use on vehicles are disclosed in U.S. Pat. Nos. 4,466,646 and 3,930,665. The energy absorbers show arrangements in which convoluted or crate type members are disposed to collapse so as to absorb energy when impact forces are directed thereagainst.

U.S. Pat. No. 4,769,951 discloses a door for motor vehicles in which all of the parts are manufactured by injection molding of plastic.

In the manufacture of inner door panels one preferred method is to load an outer vinyl skin or shell into a reaction injection mold apparatus; the shell is connected to a substrate which is carried on the mold lid; urethane foam precursors are placed in the mold cavity and reacted so as to form a foam backup layer behind the vinyl shell and to connect the substrate to the shell. The substrate is formed from either metal or mold high strength plastic which is connected to the rest of the door assembly. An example of a method for manufacturing such parts is set forth in U.S. Pat. Nos. 4,806,094 and 4,743,188 commonly assigned to the assignee of the present invention.

SUMMARY OF THE PRESENT INVENTION

The present invention includes energy absorbing components as integral parts of the outer surface of a inner door panel substrate. The parts are configured so that the substrate can be mounted on conventional reaction injection molding (RIM) apparatus and foamed in place with respect to an aesthetically pleasing inner shell or skin in a one-step process. Alternatively, the substrate can have a vacuum formed skin cover formed on its surface to define the inner door panel surface. The decorative covering for the substrate can also include a double cast vinyl skin layer backed with a low density mat such as a glass fiber mat impregnated with liquid urethane. The finished inner door panel assembly is connectible as a single piece to an outer door panel for forming an interior door space for a window and a window regulator system.

A feature of the present invention is to include a substrate in the inner door panel assembly having integrally formed collapsible members that face into the interior space of the vehicle door in a location to intercept and collapse on side impact to absorb side impact forces so as to control side door penetration into a passenger compartment.

A further feature of the present invention is to include such a substrate wherein the integrally formed collapsible members are hollow boxes closed at one end by a portion of the outer surface of the substrate and which are opened at an opposite end facing in the direction of the interior door space and in a plane inboard of a window and window regulator that are located within the interior door space.

A still further feature of the present invention is to provide a composite plastic inner door panel assembly including a plastic skin or shell forming an aesthetically pleasing interior compartment surface; a foam backing layer for the shell and a supporting substrate of molded plastic including a first plurality of hollow boxes integrally formed on the molded plastic substrate and including closed ends formed by the inboard surface of the substrate and further including open ends facing toward the interior space at the upper end of the inner plastic shell; the substrate having an inwardly directed cavity in which a second plurality of integral hollow boxes are integrally formed on the plastic substrate within the cavity; the second plurality of hollow boxes including closed ends formed by the inboard surface of the substrate and further including open ends facing toward the interior space; the second plurality of integral hollow boxes being located below the first plurality of integral hollow boxes and the first and second plurality of integral hollow boxes having inner edges thereon located substantially in the same plane inboard of window apparatus.

These and other features and advantages of the present invention will be more apparent when taken in conjunction with the detailed description when read in view of the accompanying drawings wherein:

BRIEF DESCRIPTION OF THE DRAWINGS

FIG. 1 is a perspective view of a side vehicle door;

FIG. 2 is a vertical sectional view taken along the line 2—2 of FIG. 1;

FIG. 3 is a fragmentary perspective view of integral energy absorbers on the substrate of the inner door panel assembly of the present invention;

FIG. 3A is a fragmentary perspective view of another embodiment of the present invention; and FIG. 3B is a fragmentary perspective view of still another embodiment of the present invention.

DETAILED DESCRIPTION OF A PREFERRED EMBODIMENT OF THE INVENTION

Preferred Embodiment of the Invention

Referring now to FIG. 1, a vehicle 10 is illustrated including a side door 12 which is subject to side impact forces that tend to force the door into the interior passenger compartment. The inner door panel assembly 14 of the present invention is supported on an outer door panel 16 to form an interior space 18 in which a window 20 is disposed for movement into and out of the door 12 for closing a side window opening 22. The window 20 is moved on a track 24 by known window regulator mechanism (not shown). The door 12 closes a side opening formed between the vehicle roof 23 and side and bottom vehicle frame rails 25 and 27.

In accordance with the present invention, the inner door panel assembly 14 includes a substrate 26 with an integrally formed energy absorber 28, 30 formed in the interior space 18 on the inboard side of the window apparatus, e.g., window 20, track 24 and associated regulator mechanism, show schematically at 25 in FIG. 1, so as not to interfere with its operation.

More particularly, the inner door panel assembly 14 includes an aesthetically pleasing inner shell or panel 32 which is formed by slush molding or dry plastisol casting methods of the type set forth in U.S. Pat. Nos. 4,217,325; 4,562,025; and 4,664,864 all commonly assigned to the assignee of the present application. In these methods, a thin layer of vinyl or other thermoformable plastic is formed with a class A inner surface 32a which is placed downwardly in a foam mold apparatus of the type set forth in U.S. Pat. No. 4,734,230 and commonly assigned to the same assignee as in this application.

The inner door panel assembly includes a foam backing layer 34 which is formed as stated in the '230 patent. The foam backing layer 34 is bonded to the substrate 26 when it is supported on the lid of the molding apparatus. The substrate 26 serves to form a structural support for connecting the inner door panel assembly 14 on the outer door panel 12 as for example by fasteners 36 directed through aligned flanges 26a, 12a formed at the lower end and sides of the respective members.

In the illustrated arrangement the substrate 26 has in inwardly bent surface segment 26b thereon that is formed to define a cavity for the energy absorber 30 to align it generally with the thorax of a passenger on a seat inboard of the side door 12. The surface segment 26b is located in parallelism with a like curved segment 32b of the inner shell 32 to form the outline of an armrest surface on the inside of the inner door panel assembly 14.

Additionally, the substrate 26 has a vertically extending segment 26c which is integrally connected to the energy absorber 28 from the vicinity of the upper edge of the inner shell 32 to a point adjacent the armrest surface formed by segment 32b.

In the present invention the energy absorber 28 is formed of a plurality of hollow boxes 28a each having a closed end 28b formed by the outer surface 26d of the substrate 26 and an opened end 28c facing in the direction of the interior space 18. The hollow boxes 28a are of different size and dimension by varying the dimensions of the side walls 28d thereof. The size of the boxes 28a is selected to produce a desired absorption of energy as side impact is imposed thereon to protect the upper portions of the thorax of the passenger.

Likewise, the energy absorber 30 is formed as a plurality of hollow boxes 30a having closed ends 30b formed by the outer surface 26c and opened ends 30c facing in the direction of the interior space 18. The hollow boxes 30a can vary in size by changing the dimensions of side walls 30d thereof so as to produce a desired absorption of energy in the vicinity of the lower part of the thorax.

The outer edges 28e and 30e (best shown in FIG. 2) of each of the boxes 28a and 30a are located in substantially the same vertical plane so as to be clear of the operation of the window 20 movement. On side impact, however, the outer panel 12 will penetrate against the boxes 28a, 30a to cause their collapse which in turn will absorb energy produce by side impact forces to protect the exposed soft tissue regions of a passenger's thorax. The protection is obtained without having to provide special foam formulations or special outer door surface shapes.

In FIG. 3A, the invention replaces the foam layer with a single layer of decorative skin 40 (preferably vacuum formed vinyl) over the inboard surface 42 of a high strength substrate 44 preferably formed of acrylonitrile butadiene styrene multipolymers (ABS). The substrate 44 has an integral energy absorber 46 with integral collapsible boxes corresponding to boxes 28a, 30a in the embodiment of FIGS. 2 and 3.

In FIG. 3B, the invention includes a vacuum formed vinyl skin 50, a low density molded mat 52 of urethane with glass fibers (preferably formed by injecting liquid urethane into a glass fiber mat laid against the inside of the vac-formed skin 50). Representative methods for injecting such liquid urethanes are set forth in U.S. Pat. No. 4,714,575 with a common assignee to that in the present application. The skin 50 and mat 52 cover the inside surface of a high strength ABS substrate 54. The substrate 54 has an integral energy absorber 56 comprised of collapsible boxes 58 corresponding to boxes 28a, 30a in the embodiment of FIGS. 2 and 3. Typically, the vinyl skin 50 is formed by casting a double layer of dry plastisol on a heated mold as set forth in U.S. Pat. No. 4,664,864.

Furthermore, in practicing the invention, the integrally formed energy absorbing features are located on the outside of the substrate so as to provide an unrestricted space between the skin or shell and the substrate so that the foam can flow and fully react into the intervening space therebetween.

While only one embodiment of the vehicle door of the present invention has been described, others may be possible without departing from the scope of the appended claims.

What is claimed is:

1. A composite plastic inner door panel assembly for connection to an outer door panel to define an interior space therebetween for housing window and window operator components comprising:
    a molded plastic substrate having an inboard surface and having an outboard surface;
    a layer of decorative material formed on said inboard surface including an inner plastic shell defining the full planar extent of the inner door panel assembly; and
    a plurality of hollow boxes formed integrally in said molded plastic substrate directed therefrom into the interior space for absorbing side impact energy upon collapse of said outer door panel into the interior space.

2. A composite plastic inner door panel assembly adapted to be connected to an outer door panel of a motor vehicle to define an interior space between the inner panel assembly and the outer door panel for housing window and window operator components closing a window opening and the door dimensioned to close an opening between a vehicle roof and side and bottom rails of a vehicle frame comprising:
    a molded plastic substrate having an inboard surface extending vertically from the window opening to the bottom rail and across the horizontal dimensions thereof; said substrate including an outboard surface for defining the outer surface of the inner door panel assembly;
    a layer of decorative material formed on said inboard surface including an inner plastic shell defining an aesthetically pleasing inner surface on the inner door panel assembly; and
    a plurality of hollow boxes formed integrally of said molded plastic substrate directed therefrom into the interior space for absorbing side impact energy upon collapse of the outer door panel into the interior space.

3. A composite plastic inner door panel assembly adapted to be connected to an outer door panel of a motor vehicle to define an interior space between the inner panel assembly and the outer door panel for housing window and window operator components, said door panel assembly comprising:
- a molded plastic substrate having an inboard surface and an outboard surface;
- a layer of decorative material formed on said inboard surface including an inner plastic shell defining an aesthetically pleasing inner surface on the inner panel assembly; and
- a plurality of hollow boxes integrally formed on said plastic substrate and including closed ends formed by said inboard surface of said substrate and further including open ends facing toward the interior space.

4. A composite plastic inner door panel assembly adapted to be connected to an outer door panel of a motor vehicle to define an interior space between the inner panel assembly and the outer door panel for housing window and window operator components, said door panel assembly comprising:
- a molded plastic substrate having an inboard surface and an outboard surface;
- a layer of decorative material formed on said inboard surface including an inner plastic shell defining an aesthetically pleasing inner surface on the inner panel assembly; and
- a first plurality of hollow boxes integrally formed on said plastic substrate and including closed ends formed by said inboard surface of said substrate and further including open ends facing toward the interior space at the upper end of said inner plastic shell; and
- a second plurality of integral hollow boxes integrally formed on said plastic substrate and including closed ends formed by said inboard surface of said substrate and further including open ends facing toward the interior space; means forming a vertically opening space between said first and second plurality of hollow boxes; said second plurality of hollow boxes being located below said first plurality of hollow boxes.

5. A composite plastic inner door panel assembly adapted to be connected to an outer door panel of a motor vehicle to define an interior space between the inner panel assembly and the outer door panel for housing window, window track and window operator components, said door panel assembly comprising:
- a molded plastic substrate having an inboard surface and an outboard surface said molded plastic substrate having a inwardly curved segment thereon defining a cavity;
- a layer of decorative material formed on said inboard surface including an inner plastic shell defining an aesthetically pleasing inner surface on said inner panel assembly;
- a first plurality of hollow boxes integrally formed on said plastic substrate and including closed ends formed by said inboard surface of said substrate and further including open ends facing toward the interior space at the upper end of said inner plastic shell;
- a second plurality of integral hollow boxes integrally formed on said plastic substrate within said cavity and including closed ends formed by said inboard surface of said substrate inside said cavity and further including open ends facing toward the interior space; said second plurality of integral hollow boxes being located below said first plurality of integral hollow boxes in spaced relationship thereto; and
- said first and second plurality of integral hollow boxes having inner edges thereon located substantially in the same plane inboard of the window and window track.

* * * * *